United States Patent Office 2,774,555
Patented Dec. 18, 1956

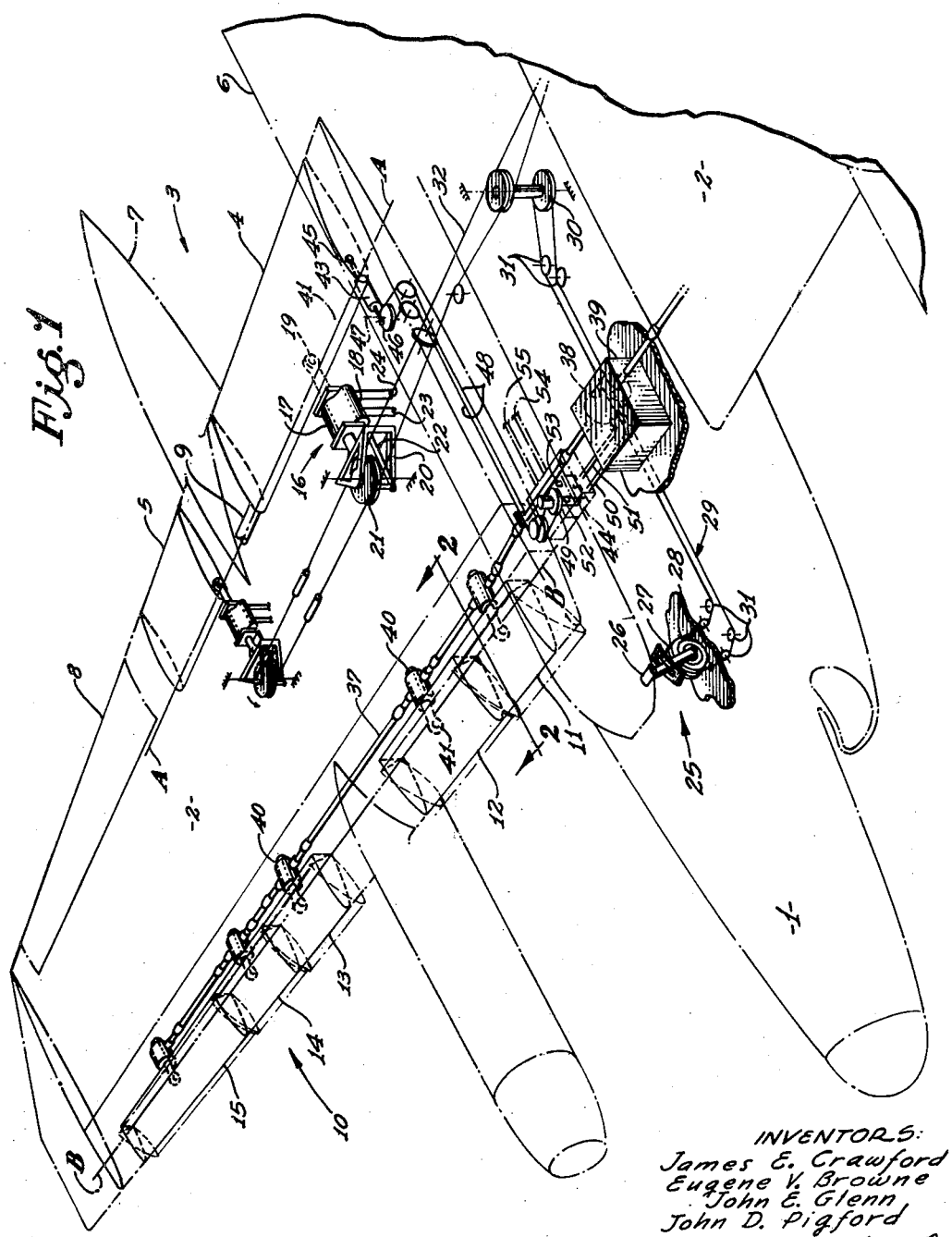

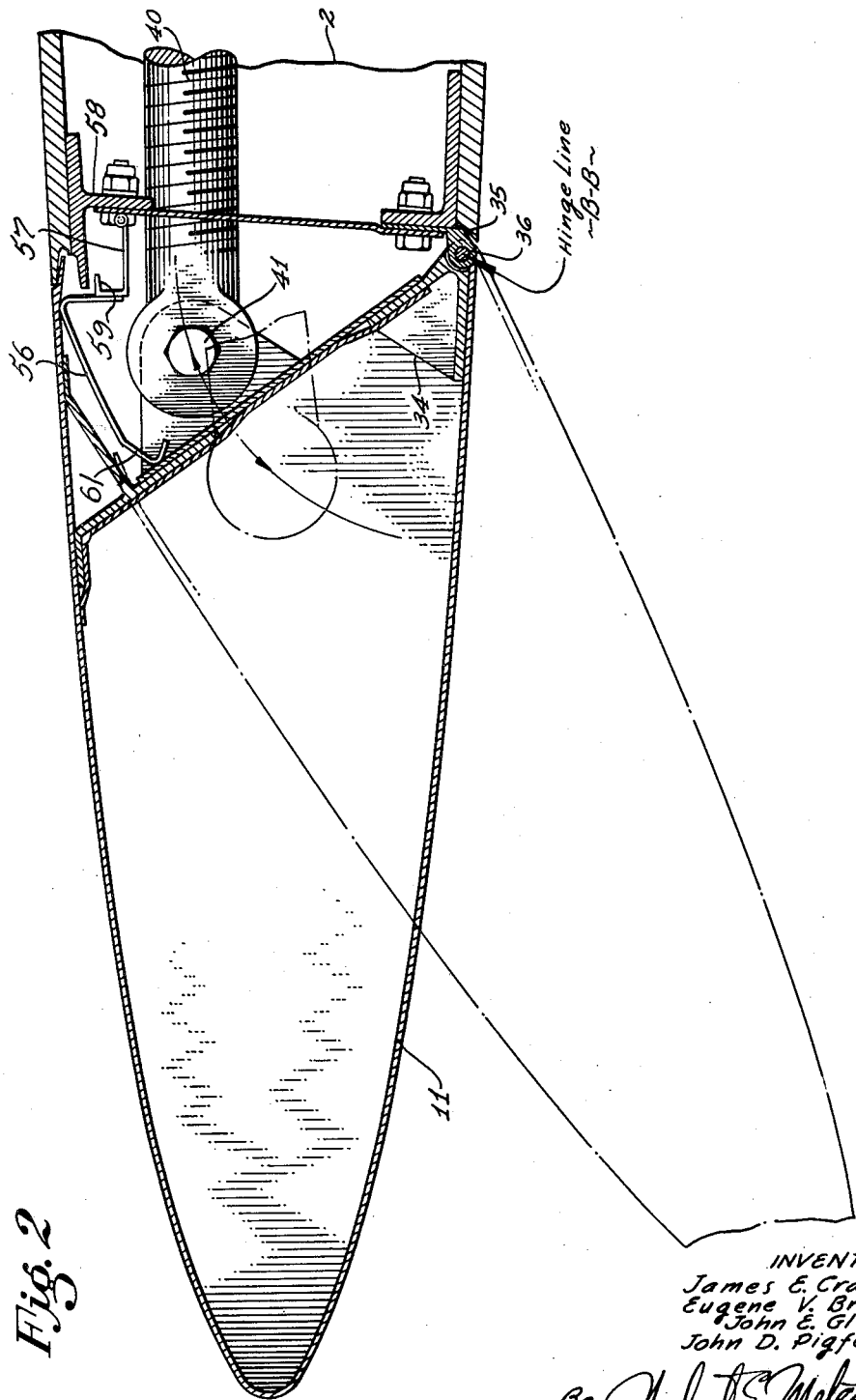

2,774,555

LEADING EDGE FLAP AND CONTROL SYSTEM

James E. Crawford and Eugene V. Browne, Los Angeles, John E. Glenn, Hawthorne, and John D. Pigford, Inglewood, Calif., assignors to Northrop Aircraft, Inc., Hawthorne, Calif., a corporation of California Application February 19, 1953, Serial No. 337,723

2 Claims. (Cl. 244—42)

The present invention relates to airplanes and more particularly to a novel leading edge flap assembly for an airplane wing, the assembly being responsive to movements of the trailing edge flaps associated with the wing.

Trailing edge flaps are universally known and utilized in connection with conventional airplanes to increase the maximum lift coefficient over that obtained by the wing itself. Also well known in aeronautical fields, although not utilized as extensively, are leading edge flaps or the combination of trailing and leading edge flaps. A leading edge flap presents a difficult structural problem, however, the additional difficulty encountered is warranted as they materially increase the wing's lift coefficient. For example a leading edge flap utilized alone may increase the maximum lift of a typical airfoil approximately 15 percent, on the same airfoil a trailing edge flap may produce approximately 38 percent additional lift. If both leading and trailing edge flaps are employed in combination the maximum lift may be increased to 46 percent, an 8 percent gain by using a leading edge flap in conjunction with that at the trailing edge.

If both leading and trailing edge flaps are employed on the same wing it is conventional practice to utilize separate controls, i. e., a control for the leading edge and a second control for the trailing edge flaps. Inasmuch as flaps are extensively used during landing and takeoff operations the addition of another control adds materially to the pilot's duties during these critical periods and distracts his attention from other and what may be more important operations.

Accordingly it is an object of the present invention to provide an airplane having flaps positioned at both the trailing and leading edges of the plane's wing, the position of the flaps being predetermined by the position of a single control element.

Another object is to provide an airplane having flaps positioned at both the trailing and leading edges of the plane's wings, movement and position of the leading edge flaps being responsive to movement of the trailing edge flaps.

Another object is to provide a novel leading edge flap assembly for an airplane wing, comprising a plurality of segments whereby the torsional stress induced therein is limited.

Another object is to provide a novel leading edge flap assembly for an airplane wing, the assembly comprising a plurality of segments which are positioned in their retracted position in a manner insuring a clean aerodynamic upper surface between the wing and flap assembly.

Another object is to provide a novel leading edge flap assembly for an airplane wing in which the assembly is firmly held in its retracted position by irreversible screw jacks and a temporarily stressed torque tube associated with the assembly.

These and other objects will become more apparent from the following description and drawings in which like reference characters denote like parts. It is to be expressly understood, however, that the drawings are for the purpose of illustration only and not a definition of the limit of the invention, reference being had for this purpose to the appended claims.

In the drawings:

Figure 1 is a diagrammatic perspective view of an airplane showing the leading edge flap assembly of the present invention and follow-up mechanism whereby movements of the leading and trailing edge flaps are coordinated.

Figure 2 is a sectional view of the leading edge flap assembly shown in Figure 1, taken on the line 2—2 thereof.

Referring to Figure 1, for a detailed description of a preferred embodiment of the present invention, an airplane 1 having laterally extending wings 2 is shown. Flaps are provided at both the leading and trailing edge of the wings. The flaps are symmetrically positioned with respect to the longitudinal axis of the plane, accordingly only those on the right side of the plane are shown and described. The trailing edge flaps 3 are divided into two segments per wing, a first segment 4 positioned and extending between the plane's fuselage 6 and wing nacelle 7, and a second segment 5 extending outwardly from the nacelle to the aileron 8. The trailing edge flaps are mounted for rotary movement about hinge line A—A, the two segments being fixedly secured to a torque tube 9 which moves with the flaps and whose axis coincides with hinge line A—A. The leading edge flaps 10 are divided into five segments per wing, segments 11 and 12 being positioned and extend between the plane's fuselage and wing nacelle, segments 13, 14 and 15 extend outwardly from the nacelle to a point adjacent the end of the wing. The leading edge flaps are mounted for rotary movement about hinge line B—B.

Dividing the leading and trailing edge flaps into a plurality of segments limits the torsional stress induced in these elements by aerodynamic forces acting thereon. As the structural members of one segment do not extend or physically contact adjacent segments an accumulation of stress between the various segments is precluded. This would not be the case if the flaps were of unitary construction, a plurality of unitary segments permits the use of lighter material in constructing the leading edge flaps, a feature highly desirable in airplane construction.

The trailing edge flaps are moved by actuators 16, comprising a hydraulic cylinder 17 and a servo valve 18, suitably positioned in the trailing edge of the wing. The actuators are of the type disclosed and claimed in copending U. S. application Ser. No. 297,725, dated July 8, 1952, now U. S. Patent No. 2,640,466, in which the action of the valve is automatically neutralized by cylinder movement. The closed end of cylinder 17 is pivotally attached to the nose portion of the flaps by a hinge pin 19 which is radially spaced with respect to the axis A—A. The piston rod is pivotally attached to a bracket 20 mounted to a non-movable structural element of the wing. Supported for rotary movement by the bracket 20 are cable pulleys 21, the servo valves 18 being connected to the pulleys by suitable push rods 22. Suitable conduits 23 and 24 constitute pressure and return lines between actuators 16 and a source of hydraulic fluid (not shown).

A flap control unit 25, comprising a handle member 26, pulley 27, and torsional prepositioning spring 28, is suitably mounted in the pilot's cockpit, the control unit being of the type disclosed and claimed in copending U. S. application Ser. No. 127,062 dated November 14, 1949, now U. S. Patent No. 2,665,084. Movements of the control unit 25 are transmitted by a cable system 29 extending between the pulley 27 and a pulley assembly 30, the cable being supported in proper position by suitable idler pulleys 31. The movement of the control unit is further transmitted to pulleys 21 by a cable system 32 rigged in a conventional manner.

The segments 11 to 15, inclusive, pivot about hinge line B—B located between the segments and the forward portion of the wing adjacent and slightly above their lower surfaces, as best shown in Figure 2. Attach elements 34 and brackets 35 secured to the segments and wing, respectively, provides bearing support for pins 36 about which the segments pivot. The flaps are actuated by means of a torque tube 37, the tube extending from and being driven by a hydraulic motor 38 associated with a leading edge flap drive mechanism 39, and a plurality of conventional irreversible screw jacks 40, one screw jack being utilized per segment. The non-movable portion of the jacks are pivotally attached to a structural member of the wing, the movable or screw portion is pivotally attached to the segments by hinge pins 41 radially spaced with respects axis B—B.

At such times as the leading edge flaps are in their full down positions the aerodynamic continuity of the wing 2 with respect to the leading edge flaps is maintained by filler plates 56. As the leading edge flaps are lowered the filler plates are urged into the openings occurring between the upper skin portions of the wing and leading edge flaps by resilient members 57. With the flaps in their full down position respective filler plates completely occupy the above mentioned openings and are located therein by projecting portions 59, of the members 57, contacting an overhanging portion of the spar 58. As the flaps are returned to their retracted positions the plates 56 are automatically returned to the position shown in Figure 2. During the movement of the flaps, that is to their retracted positions, the upper skin portions of the flaps contact the inclined portion 61 of the members 56 and subsequently the upper surface of members 56 returning the latter to their retracted positions.

Movement of the leading edge flaps is initiated by movement of the trailing edge flaps by means of a follow-up mechanism. The follow-up mechanism comprises a spring preloaded push-pull rod 43, the spring preloaded push-pull rod being of a type well known in the art, a hydraulic valve 44, suitable follow up cables 48, and the flap drive mechanism 39. One end of the push-pull rod 43 is pivotally attached to the nose portion of segment 4 by hinge pin 45 at a point radially spaced with respects to axis A—A, the other end is pivotally attached to a pulley 46 mounted for rotary movement about axis 47. The follow-up cables 48 transmit rotary movement of pulley 46 to a pulley 49 and valve element (not shown) comprising an element of valve 44. Valve 44 is of the four way type, the valve permitting fluid to flow to the hydraulic motor 38 through either conduit 50 or 51 according to the position of the valve element. Thus, it is seen that the motor 38 may be energized to rotate in either a clockwise or counterclockwise direction to raise or lower the leading edge flaps.

The fully open position of the valve element in which the valve directs pressure fluid to the motor 38, for example via conduit 50, is determined by the retracted position of segment 4, the valve in its alternate fully opened position in which it directs pressure fluid to the motor 38 via conduit 51, is determined by stops 52 and 53 as presently explained.

The full down position of the leading edge flaps, which in the present embodiment is 35 degrees, is controlled by conventional stop means (not shown) associated with the motor 38 and may be constructed as disclosed in copending U. S. application Ser. No. 431,778, dated May 24, 1954. After a predetermined number of revolutions of the motor 38, sufficient to lower the leading edge flaps to their down position, the stop means stalls the motor 38. Fluid under pressure continues to act on the motor maintaining it in its stalled position until the flow of fluid is reversed, during this time the leading edge flaps are held in their down position. Conduits 54 and 55 constitute pressure and return lines and communicate with valve 44 and a source of hydraulic fluid (not shown).

In the fully retracted or normal position of the leading edge flaps, the upper surface of the wing and upper surface of the flap contact each other, as best seen in Figure 2. This means of positioning the flaps in their up positions is advantageous, it insures positive contact between the two surfaces and precludes the possibility of a non-contacting relationship of poor aerodynamic shape as might be the case if other stop means were utilized.

The leading edge flaps are rigged in their down positions so that the flap 11 is approximately two tenths (.2) of a degree lower than flap 12, flap 12 is two tenths (.2) of a degree lower than flap 13, etc. In other words with the motor 38 stalled, with the flaps in their full down positions, each flap is removed from its respective retracted position by a different angular amount. Accordingly as the flaps are returned to their retracted positions the outboard flap 15 is the first to reach its retracted position, flap 14 reaches its retracted position slightly after flap 15, etc. As the flap 11 reaches its retracted position the motor 38 is stalled effectively maintaining torque in the tube 37 and thereby retaining all flaps in their retracted positions until the flow of fluid to the motor 38 is reversed. The slight difference in angular movement through which the various flaps travel in moving between their respective retracted and full down positions is made possible by a slight twisting of the rod 37 as explained presently. The exact amount an outboard segment leads its adjacent inboard segment is arbitrary and may vary with different installations.

The segments rigged in the above manner insures that each segment will return to its full up or retracted position. This would not be the case if segment 11, for example, contacted the upper surface of the wing first, in the latter instance the motor 38 would stall before segments 12 to 15 inc., were returned to their retracted positions. Segment 15 being returned to its retracted position first embodies an additional advantage, temporary torque is induced in that portion of tube 37 between the jacks associated with segments 15 and 14 before segment 14 reaches its retracted position. This torque accumulates in tube 37 as the other segments are moved to their retracted positions, the torque thus accumulated in tube 37, in cooperation with irreversible jacks 40, functions to maintain the segments firmly in their retracted position. With the present embodiment thus generally described, the relation of the various parts will be made clearer by the following description of their operation.

If additional lift is desired the pilot moves the handle of control unit 25 to a position corresponding to the desired flaps down position. This movement is transmitted to servo valves 18 by the various cables, this operation permitting fluid to flow to hydraulic cylinders 17. Accordingly the trailing edge flaps are lowered until the force exerted by pre-positioning spring 28 is neutralized and the action of servo valve 18 is also neutralized. The trailing edge flaps will assume a lowered position, corresponding to the setting of handle 26 remaining in this position until the handle is again moved.

If the trailing edge flaps are lowered by an amount of 10 degrees or more, the leading edge flaps are automatically lowered to their full down position by means of the follow-up mechanism. For illustrative purposes it is assumed that during the time the leading edge flaps are in their retracted position, fluid flows to motor 38 tending to rotate it in a clockwise direction. The motor during this period is stalled as the upper surface of the wing and the upper surface of segments 11 to 15, inc., are contacting each other, i. e., the two surfaces provide structural stops positioning the flaps in their retracted position. With the lowering of trailing edge segment 4 rotary movement is imparted to the valve element allowing fluid to flow to motor 38 to produce counterclockwise movement, this change in fluid flow initially begins in the present embodiment when the trailing edge flaps are at their 10 degree down position, obviously it may occur at any other predetermined position. The valve 44 is fully open to pressure fluid flowing to motor 38, tending to rotate it in a counterclockwise direction, when the valve element has rotated approximately 90 degrees from its original position. Further movement of the valve element is then arrested by stops 52 and 53 contacting each other, relative movement occurring thereafter between the aft portion of rod 43 and its forward portion is absorbed by a preloaded spring (not shown) located in push pull rod 43. At any lower position of the trailing edge flaps, that is exceeding 10 degrees, the leading edge flaps are lowered to their full down position.

When the trailing edge flaps are raised, to any position less than 10 degrees from their retracted position, the flow of hydraulic fluid to the motor 38 is reversed by the followup mechanism. As explained above segment 15 reaches its retracted position first, sequentially followed by segments 14 to 11, respectively. This permits a temporary torque to be induced in tube 37 which in cooperation with irreversible jacks 40, effectively retains all segments in their retracted position. As the upper surfaces of the wing and flaps are flush and abut each other in their retracted position a clean continuous upper surface of the wing is assured.

While in order to comply with the statutes, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. In an airplane having a laterally extending wing: a first flap assembly mounted on the trailing edge of said wing for angular movement through an operating range between retracted and full down positions with respect to said wing; a predetermined portion of said operating range adjacent said retracted position constituting an initial range and the remainder of said operating range constituting a final range of said first flap assembly; a second flap assembly mounted on the leading edge of said wing for angular movement between retracted and full down positions with respect to said wing; a first and a second set of actuators pivotally attached to and extending between said wing and said first and second flap assemblies, respectively, and adapted to move said respective flap assemblies between said retracted and full down positions thereof when actuated; power means mounted in said airplane for actuating said second set of actuators; a control unit pivotally mounted on said plane; control means operationally connecting said control unit and said first set of actuators whereby said first flap assembly may be moved throughout said operational range in response to movements of said control unit; a follow up mechanism, including a movable element adapted to control the flow of power to said power means, operationally extending between said first flap assembly and said second power means whereby said second flap assembly is caused to assume said retracted position or said full down position at such times as said first flap assembly is positioned in said initial or said final range, respectively.

2. Apparatus as set forth in claim 1 wherein said power means comprises a bidirectional rotary fluid motor mounted on said plane, a continuous torque tube operationally extending between said motor and said second set of actuators, said movable element comprises a four-way valve having first and second positions in which said valve is adapted to direct fluid flow to said motor to effect rotation of the latter in a clockwise and a counter-clockwise direction, respectively, said valve being responsive to movements of said first flap assembly, through said follow-up mechanism, whereby said valve is positioned in said first or said second position thereof when said first flap assembly is positioned in said initial or said final range, respectively.

References Cited in the file of this patent

UNITED STATES PATENTS

| | | |
|---|---|---|
| 1,282,494 | Thompson | Oct. 22, 1918 |
| 1,631,259 | Gilmore | June 7, 1927 |
| 1,767,966 | Crook | June 24, 1930 |
| 2,295,306 | Tampier | Sept. 8, 1942 |
| 2,346,464 | Tampier | Apr. 11, 1944 |
| 2,381,678 | Maxwell | Aug. 7, 1947 |
| 2,422,296 | Flader et al. | June 17, 1947 |
| 2,472,653 | Eaton | June 7, 1949 |
| 2,582,348 | Northrop et al. | Jan. 15, 1952 |
| 2,609,165 | Hill | Sept. 2, 1952 |
| 2,650,047 | Cazhart et al. | Aug. 25, 1953 |